United States Patent

LaLiberte et al.

[11] 4,273,809
[45] Jun. 16, 1981

[54] METHOD OF PREPARING CAST RESIN LENSES

[75] Inventors: Norman U. LaLiberte, Woodstock, Conn.; Don H. Rotenberg, Westboro, Mass.

[73] Assignee: American Optical Corporation, Southbridge, Mass.

[21] Appl. No.: 88,318

[22] Filed: Oct. 25, 1979

[51] Int. Cl.³ .......................... B05D 7/02; B05D 5/06
[52] U.S. Cl. ..................................... 427/155; 264/1.1; 427/162; 428/412; 427/164; 427/385.5
[58] Field of Search ............... 428/412; 427/155, 162, 427/164, 385 R; 264/1

[56] References Cited

U.S. PATENT DOCUMENTS

| 2,542,386 | 2/1951 | Beattie | 264/1 |
|---|---|---|---|
| 3,056,166 | 10/1962 | Weinberg | 249/102 |
| 3,136,000 | 6/1964 | Slyk | 249/141 |
| 3,881,683 | 6/1975 | Whitney | 249/117 |
| 3,971,872 | 7/1976 | LeBoeuf | 428/412 |
| 4,064,308 | 12/1977 | Laurin | 428/412 |
| 4,079,160 | 3/1978 | Philipson | 428/412 |

FOREIGN PATENT DOCUMENTS

| 121624 | 7/1946 | Australia | 427/155 |
|---|---|---|---|
| 471512 | 2/1951 | Canada | 427/155 |

Primary Examiner—Ellis P. Robinson
Attorney, Agent, or Firm—Alan H. Spencer

[57] ABSTRACT

Cast resin lenses which are removed from casting molds early in a cure cycle are coated for protection against exposure to oxygen to provide increased post cure surface polymerization and abrasion resistance.

9 Claims, 6 Drawing Figures

METHOD OF PREPARING CAST RESIN LENSES

BACKGROUND OF THE INVENTION

1. Field of the Invention

Manufacture of cast resin lenses with particular reference to improvements in post-cure procedures.

2. Discussion of the Prior Art

In the manufacture of lenses of cast allyl diglycol carbonate and copolymers of the monomer and other resins, it is desirable to remove the castings early in the cure cycle for ease of separation from the molds and to prevent costly breakage of molds at separation. This early removal, however, requires post-curing of the cast lenses wherein exposure to oxygen normally inhibits further polymerization of the surfaces of the lenses. Accordingly, the lenses are left vulnerable to surface abrasion and are difficult to dye to uniform color densities.

In view of the foregoing, an object of this invention is to avoid the usual low surface cure of post-cured lenses that have been removed from their molds early in the preliminary curing cycle.

A further object is to accomplish greater than usual yield and quality of cast lens products with minimal cost and complication of equipment and/or procedure.

Other objects and advantages of the invention will become apparent from the following description.

SUMMARY OF THE INVENTION

The above objectives and those thay may follow are accomplished by coating the partially cured lenses with a layer of removable material, e.g. polyvinyl alcohol, which will shield their surfaces from environmental oxygen during post-cure. By such means, surface polymerization which is normally inhibited by the presence of oxygen is now permitted to take place during post-cure. This renders the lenses highly abrasion resistant and readily uniformly dyeable after removal of the protective coatings, e.g. in a solution of sodium carbonate.

Details of the invention will become more readily apparent from the following description when taken in conjunction with the accompanying drawings.

DESCRIPTION OF THE PREFERRED EMBODIMENTS

With the discovery that oxygen inhibits polymerization of surfaces of cast resin lenses in post curing operations, this invention has devised a post cure procedure which avoids the usual inadequate surface polymerization. To this end, a lens L cast in a cell 10 between a pair of mold halves 12 and 14 is removed, i.e. "picked", early in the curing cycle for purposes of easing its removal and to free the mold halves for easy cleaning and reuse as well as to prevent moldpiece breakage by excessive lens material adherence which may result from full curing in the moldpieces.

Early removal of a cast lens from a casting mold is herein considered as being any time prior to completion of polymerization of the casting precursor but after there has been sufficient gelation to permit handling. It is also pointed out that the casting cell may be designed to produce finished ophthalmic surfaces on one or both sides of lens L. Hence, use of the term "lens" herein is intended to include all forms of the article, i.e. either completely surface finished or finished on one side only as in the case of lens articles which are commonly called blanks.

Figure 1:
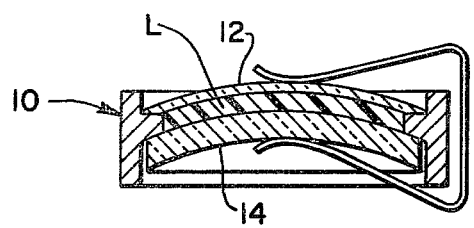
FIG. 1 is an illustration in cross-section of the apparatus and method used to cast resin lenses.
Figure 2:
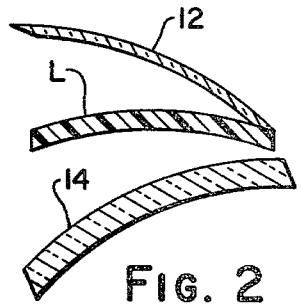
FIG. 2 illustrates partial removal of a lens from its casting apparatus.
Figure 3:
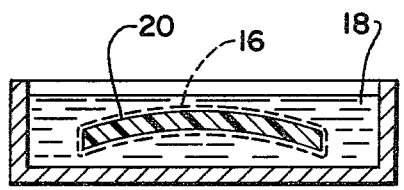
FIG. 3 illustrates dip coating of the lens after complete removal from its casting apparatus.
Figure 4:
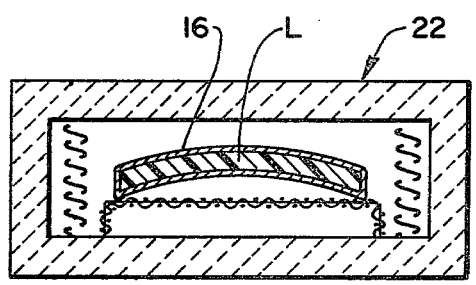
FIG. 4 depicts a post-curing oven in which the coated lens is placed for post-curing.

The removed partially cured lens must, however, be further cured for completion of its polymerization into a usable article. In view of exposure to oxygen which inhibits surface polymerization in ordinary post-curing operations, the picked lens is herein provided with coating 16 (FIGS. 3 and 4) by dipping (FIG. 3) into a readily removable inert coating material 18 (FIG. 3) such as polyvinyl alcohol which is impervious to oxygen. Coating 16, which may alternatively be painted or sprayed in place, protects lens surface 20 from exposure to environmental oxygen so that post curing in oven 22 (FIG. 4) can proceed with an assurance of full curing (polymerization) of all lens surfaces as well as the interior. By such means, the lenses are afforded improved scratch resistance and an adaptability to easy and uniform dyeing.

Post curing in oven 22 at a temperature of approximately 200° F. for approximately one to three hours will produce desirable final polymerization of lenses or blanks of the well recognized normal size and/or shape. Greater than usual lens or blank sizes may require longer cycling and/or higher curing temperatures for complete internal care. This would be immediately recognized by those of ordinary skill in the art who would further find no difficulty in determining proper extensions of post-curing time.

Removal of coating 16, e.g. in a warm aqueous alkaline solution 24 of 1% sodium carbonate, renders the lens ready for use. It may be alternatively or additionally washed in clear warm water if desired. Warming of the aqueous alkaline solution or clear water to approximately 190° F. will produce desirable results.

Useful coating materials 18 (FIG. 3) are:

| | | |
|---|---|---|
| 1% PVA | Distillled | |
| (Polyvinyl alcohol) | Water | 1,000 grams |
| | PVA | 10 grams |
| | Wetting Agent | 4 drops |
| 2% PVA | Distilled Water | 1,000 grams |
| | PVA | 20 grams |
| | Wetting Agent | 4 drops |
| 4% PVA | Distilled Water | 1,000 grams |
| | PVA | 40 grams |
| | Wetting Agent | 4 drops |

In the foregoing examples of coating solutions, the use of polyvinyl alcohols of molecular weights between 10,000 and 90,000 are preferred. Suitable wetting agents are alkyl aryl sodium sulfonate, sodium lauryl sulfate, octylphenyl polyethoxyethanol and/or other high molecular weight sulfones.

Figure 5:
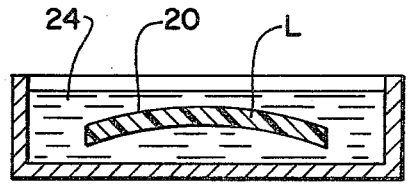
FIG. 5 illustrates removal of the coating material after final lens curing.

Solution 24 of sodium carbonate (FIG. 5) which is used to remove coating 16 may alternatively comprise one or combinations of sodium hydroxide, potassium hydroxide and potassium carbonate in approximately from 1% to 5% solutions. Plain water may also be used.

Figure 6:
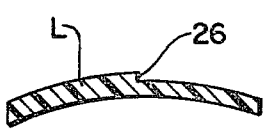
FIG. 6 illustrates, in cross section, an alternative form of lens to which the present invention is especially applicable.

While FIGS. 1–5 of the drawings have illustrated lens L as having smooth, i.e. uninterrupted, opposite side surfaces, it should be understood that this invention is equally applicable to the post-curing of all of the other forms of lenses encountered in the field such as those known as multifocals, for example. These lenses may have one or more sharp ledges 26 cast partially or fully across one of their sides as illustrated in FIG. 6. Ledged lenses, being somewhat more difficult to remove from casting molds than continuous surface lenses, are particular candidates for early removal and post-curing according to this invention.

While this invention has been directed more particularly to lenses cast of allyl diglycol carbonate or copolymers of the monomer, it should be understood that it is equally applicable to the post-curing of articles formed by means or method other than casting and/or materials other than allyl diglycol carbonate which may be similarly adversely affected by exposure to atmospheric gases during post curing. Also, those seeking details of prior art lens casting operations may refer to U.S. Pat. Nos. 2,542,386; 3,136,000; 3,056,166 and/or 3,881,683 as examples.

It is intended that the foregoing disclosure and accompanying illustrations be exemplary of the invention and not delimiting of its scope. All modifications of process or equipment apparent to those skilled in the art are considered to be within the scope of this invention.

We claim:

1. The method of making a post-cured cast resin lens comprising the steps of:
    casting an allyl diglycol carbonate resin in a mold to the shape desired of said lens;
    partially curing said resin in said mold to produce a lens body;
    removing the partially cured lens body from said mold;
    coating the partially cured lens body with a readily removable material which is impervious to oxygen;
    exposing the coated lens body to a post-curing temperature above room temperature until substantially complete polymerization of all portions and surfaces of said lens body beneath said coating takes place; and
    removing the aforesaid coating for exposure and use of the post-cured lens which features high surface cure and abrasion resistance.

2. The method according to claim 1 wherein said lenses are coated with polyvinyl alcohol.

3. The method according to claim 2 wherein said lenses are coated by dipping in a solution of polyvinyl alcohol.

4. The method according to claim 3 wherein said solution comprises approximately from 1% to 4% polyvinyl alcohol in water.

5. The method according to claim 3 wherein said solution includes a wetting agent.

6. The method according to claim 1 wherein said coatings are removed with an approximately 1% to 5% solution in water of an ingredient selected from the group consisting of sodium carbonate, sodium hydroxide, potassium hydroxide and potassium carbonate.

7. The method according to claim 6 wherein said solution is warmed for improved coating removal.

8. The method according to claim 7 wherein said warmed solution is approximately 1% sodium carbonate at a temperature of approximately 190° F.

9. The method according to claim 1 wherein said cast lenses comprise at least one optically finished surface over which said coatings are applied.

* * * * *